No. 734,655. PATENTED JULY 28, 1903.
C. BARBER.
SYSTEM OF ELECTRICAL SIGNALING FOR RAILROADS.
APPLICATION FILED MAR. 14, 1902.
NO MODEL. 2 SHEETS—SHEET 1.

Fig. 1.
Fig. 6.

Witnesses
C. Barber, Inventor.
by C.A. Snow & Co
Attorneys

No. 734,655. PATENTED JULY 28, 1903.
C. BARBER.
SYSTEM OF ELECTRICAL SIGNALING FOR RAILROADS.
APPLICATION FILED MAR. 14, 1902.
NO MODEL. 2 SHEETS—SHEET 2.
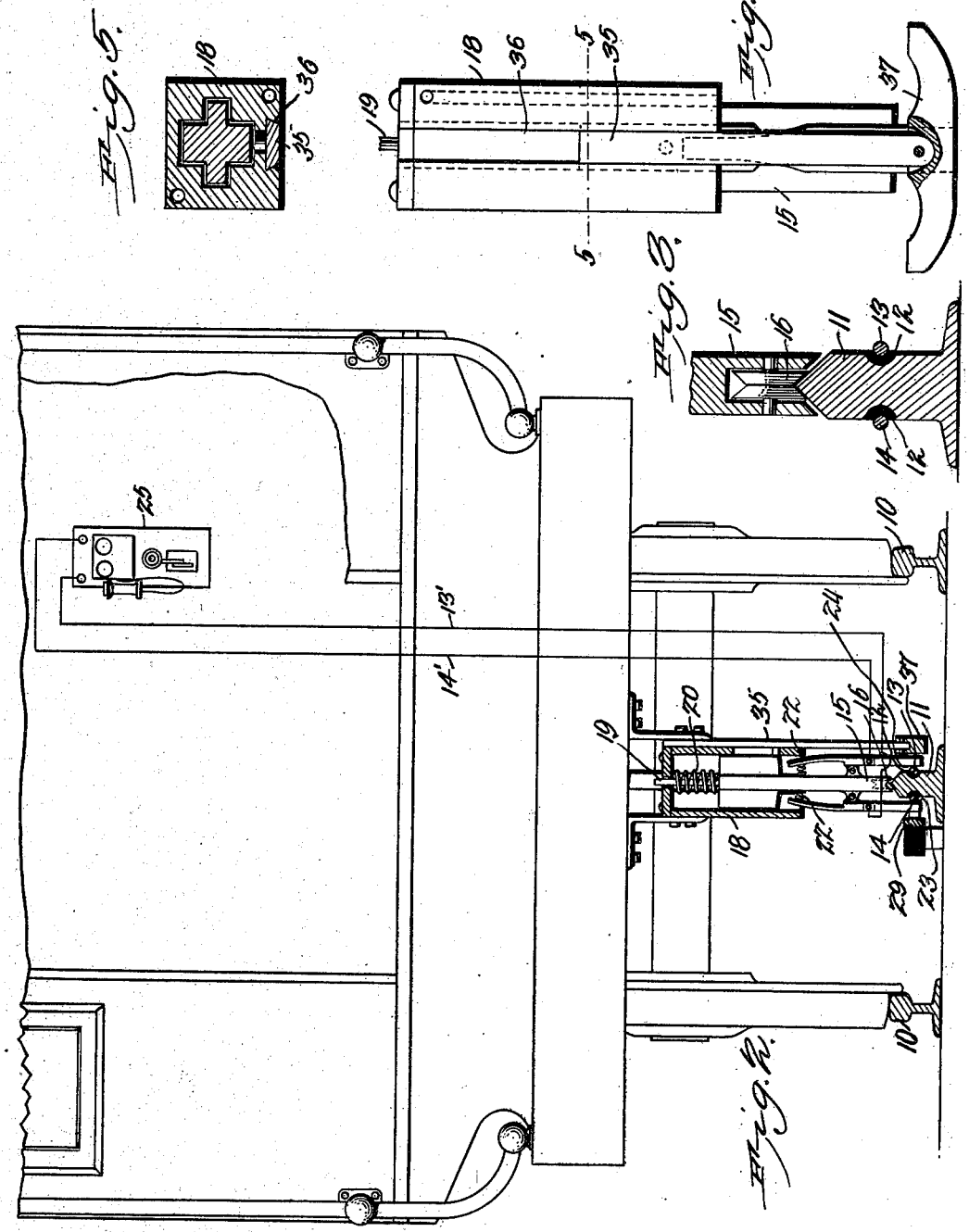

No. 734,655. Patented July 28, 1903.

UNITED STATES PATENT OFFICE.

CYRUS BARBER, OF KEENE, NEW HAMPSHIRE, ASSIGNOR OF SEVEN-EIGHTHS TO DANIEL R. COLE, JOSIAH W. BUCKMINSTER, AND CHARLES G. PUTNEY, OF KEENE, NEW HAMPSHIRE, AND PAUL S. HORTON, OF WARREN, PENNSYLVANIA.

SYSTEM OF ELECTRICAL SIGNALING FOR RAILROADS.

SPECIFICATION forming part of Letters Patent No. 734,655, dated July 28, 1903.

Application filed March 14, 1902. Serial No. 98,222. (No model.)

*To all whom it may concern:*

Be it known that I, CYRUS BARBER, a citizen of the United States, residing at Keene, in the county of Cheshire and State of New Hampshire, have invented a new and useful System of Electrical Signaling for Railroads, of which the following is a specification.

My invention relates to certain improvements in electrical signaling systems of that class employed for signaling between trains and stations on a railway-line, and has for its principal object to provide a system by means of which trains entering and leaving a block will automatically close an alarm-circuit at a block-station and in which a train entering on an occupied block will sound an alarm in the engine of the train already in said block.

A still further object of the invention is to provide for a ready means of communication, as by telephone or telegraph, between two trains on the same block or between any block-station and a train or trains on the block or blocks to which the station is connected.

A still further object of the invention is to provide for the automatic movement of the connecting devices from contact with the conducting devices on approaching a crossing, switch, or the like where a traffic-rail is disposed in the path of the conductors and to automatically reëngage the connecting devices with the conductors after passing such crossing or switch.

A still further object of the invention is to so dispose and arrange the current-conductors on the third rail as to reduce to a minimum the chances of accidental short-circuiting.

With these and other objects in view the invention consists in the novel construction and arrangement of parts hereinafter described, illustrated in the accompanying drawings, and particularly pointed out in the appended claims.

In the drawings, Figure 1 is a diagram illustrating an electrical signaling system arranged in accordance with my invention. Fig. 2 is a rear elevation, partly in section, of the system, illustrating the traffic-rails, the third rail having current-conductors, a portion of a locomotive, and the contacts carried thereby. Fig. 3 is an enlarged detail sectional view of the same. Fig. 4 is a side elevation of the carriage which supports the contact-blocks. Fig. 5 is a sectional plan view of the same on the line 5 5 of Fig. 4. Fig. 6 is a sectional elevation of a crossing, showing the contact devices elevated.

Similar numerals of reference are employed to designate corresponding parts throughout the several figures of the drawings.

The traffic-rails 10 are arranged and constructed in the usual manner for the support of the wheels of the train and are not employed as conductors in connection with the present system.

Arranged centrally between the traffic-rails is a third rail 11, which may be formed of any suitable material, the opposite sides of the rail being recessed or provided with longitudinal grooves for the reception of insulating material 12, serving as a support for two current-conducting bars or wires 13 and 14, through which communication may be established between trains and stations along the line. The top of the third rail is substantially V-shaped in cross-section and serves to support a carriage 15, having suitable bearings for an antifriction-wheel 16, adapted for contact with the rail, the wheel being of any suitable diameter and serving merely to reduce friction by preventing actual contact between the third rail and the carriage. The carriage, which may be of substantially the form shown in Fig. 5, is adapted to guideways formed in a support 18, depending from the frame of the locomotive or car, the upper end of the carriage being provided with a guiding-stem 19, extending up through a suitable opening in the support, and a spring 20 being employed to normally hold or press the antifriction-wheel 16 against the third rail.

On each of the carriages are arranged two contacts, one disposed on either side of the carriage and adapted for contact with the current-conducting rods or wires 13. Each contact is in the form of a pivoted arm, the upper end of which is pressed outwardly by a spring 22 in order that its lower conducting-face may be kept in intimate contact with the wires or rods. The contact-faces 23 and 24 press against the conducting wires or rods 13 and 14, respectively, and said contact-faces form the terminals of a circuit, including a telephone 25 in the cab of the engine, the telephone system being arranged in the ordinary manner and provided with a call-bell 26, which may be sounded when the calling-circuit is energized. The circuit is completed by the wires 13' and 14', extending, respectively, from the contact-faces 23 and 24.

Each block or section of the road is separate from adjacent blocks, the current-conductors being connected at the ends of the block by wires 27 28 to a station comprising a telephone and provided with suitable batteries or other devices for energizing the circuit, and at a point near each end of the block are arranged fixed contacts 29, forming the terminal of a circuit which includes a battery 30. The contact-blocks 29 are arranged at each end of the block and are preferably disposed in different order, or the number may vary at opposite ends of the block in order that a suitable signal may be sounded in the station to determine when a train enters and when it leaves the block. These contact-blocks are brought into contact with the contact-block 23, carried by one of the pivoted contact-arms on the carriage, while that portion of the contact wire or rod 14 opposite to the contact-block 29 is insulated or covered in a manner which will prevent electrical contact between the surface 23 and the conducting wire or rod during the time the contact-face 23 is in contact with the block 29.

The arrangement of the circuit is such that the telephone at a station will be arranged connected with the telephone of each train or block, so that the attendant at the station can open communication with any train on the block, or vice versa, or one train may communicate with another train on the block by operating the telephone calling-circuits in the usual manner.

When a train enters or leaves the block, the contacts of the block 29 and the contact-face 23 will temporarily establish a circuit through the station-battery 30, the auxiliary station-circuit, and a calling-circuit of each train-telephone on the block, so that the station agent is notified of the entry of the train on the block and is likewise notified when the train leaves the block, the number of contacts being varied, so that the different signals may be clearly defined. In similar manner any train already on the block is immediately notified on the entry of a second train or on the leaving of such a train.

In the operation of the system the movable contacts carried by the locomotive-carriage are kept constantly in contact with the conductors 13 and 14, so that on the closing of the circuit the call-signals will be sounded, or on energizing a circuit in the usual manner by the telephone-switch or magneto the alarm will be sounded in each train on the block and block-station.

The conductors 13 and 14 are arranged on opposite sides of the third rail, so as to minimize the chances of accidental short-circuiting, as in the event of a workman placing a bar on the rails.

In order to prevent grounding at crossings and at other points where traffic-rail may lie in the path of the third rail, the third rail must be discontinued and the current-conductors 13 and 14 be carried under ground between the sections of the third rail. To prevent any accidental contact between the contact-carriers and the crossing traffic-rail, the carriage is connected to a vertically-disposed bar 35, adapted to a dovetailed guiding-slot 36 in the carriage-support, the lower end of said bar being connected to a pivoted shoe 37, which makes contact with a guard-rail or similar device so arranged as to move the bar upwardly, raising the contact-arms to the block from the conductors and permitting said contact-arms to pass over the traffic rail or rails without striking the same. The guard-rail is as a matter of course in sections, so that the crossing traffic-rail may freely pass, the shoe 37 being made of sufficient length to bridge the space between sections of the guard-rail and keep the contact-arms in elevated position until such crossing-rail is passed, after which the guard-rails are inclined in an opposite or downward direction to again permit the contact-arms to connect with the conductors 13 and 14. The upper ends of the contact-arms are bent inwardly to some extent and when slightly raised are brought into contact with oppositely-disposed shoulders on the carriage-support, the contact-faces of the arms being separated, so as to permit perfect freedom of movement during the vertical travel of the carriage.

While the construction of parts and the arrangement of the system as herein described and illustrated in the accompanying drawings is the preferred embodiment of the invention, it is obvious that various changes in the form, proportions, size, and minor details of the apparatus may be made without departing from the spirit or sacrificing any of the advantages of my invention.

Having thus described my invention, what I claim is—

1. A railway signaling system, comprising a pair of main conductors arranged along the road-bed, contact devices carried by the trains for engaging said conductors, signaling devices carried by the trains, signaling devices arranged in the railway-stations, an auxiliary alarm-circuit connected to the signaling-circuit, an auxiliary contact forming one terminal of the alarm-circuit, said auxiliary contact being arranged adjacent to an insulated portion of one of the main conductors and being engaged by the contact devices carried by the trains for closing the alarm-circuit in the trains and stations as the train is leaving or entering a block.

2. A block-signaling system for railways, comprising signaling and alarm devices arranged at the block-stations and on the trains, a pair of main conductors arranged in the signaling-circuit and one of which forms a part of the alarm-circuits, said conductors extending along the road-bed, contact devices carried by the trains for engaging said main conductors, auxiliary stationary contacts forming the terminals of the alarm-circuits and adapted to be engaged by the train contact devices to close an alarm-circuit as the train is leaving or entering a block, one of said main conductors being bent out of the path of travel of the traveling contact device by which it is normally engaged at points opposite said auxiliary stationary contacts.

3. In a device of the class described, a third rail having grooves in its opposite sides, insulated conductors arranged in said grooves, a vertical guide-carriage having a supporting-wheel for contact with the top of the rail, a pair of contact-arms pivoted to the carriage and adapted to engage the conductors, a shoe depending from the carriage, and means disposed at railway-crossings for engaging said shoe and elevating the carriage to prevent contact of the carriage and its arms with crossing rails.

4. In a device of the class specified, a third rail, a pair of conductors arranged on opposite sides of the rail, a vertical movable spring-pressed carriage having a supporting-wheel for contact with the third rail, a support for the carriage, a vertically-guided bar carried by said support and connected to the carriage, a pivoted shoe connected to said bar and adapted for contact with an elevating device on the approach of the crossing traffic-rail, and a pair of spring-pressed contact-arms adapted for contact with the conductors, and having inwardly-bent upper ends adapted to make contact with a fixed portion of the carriage-support to spread the lower ends of said contact-arms as the carriage is raised, substantially as specified.

In testimony that I claim the foregoing as my own I have hereto affixed my signature in the presence of two witnesses.

CYRUS BARBER.

Witnesses:
  JNO. E. PARKER,
  FRANK S. APPLEMAN.